Patented July 18, 1950

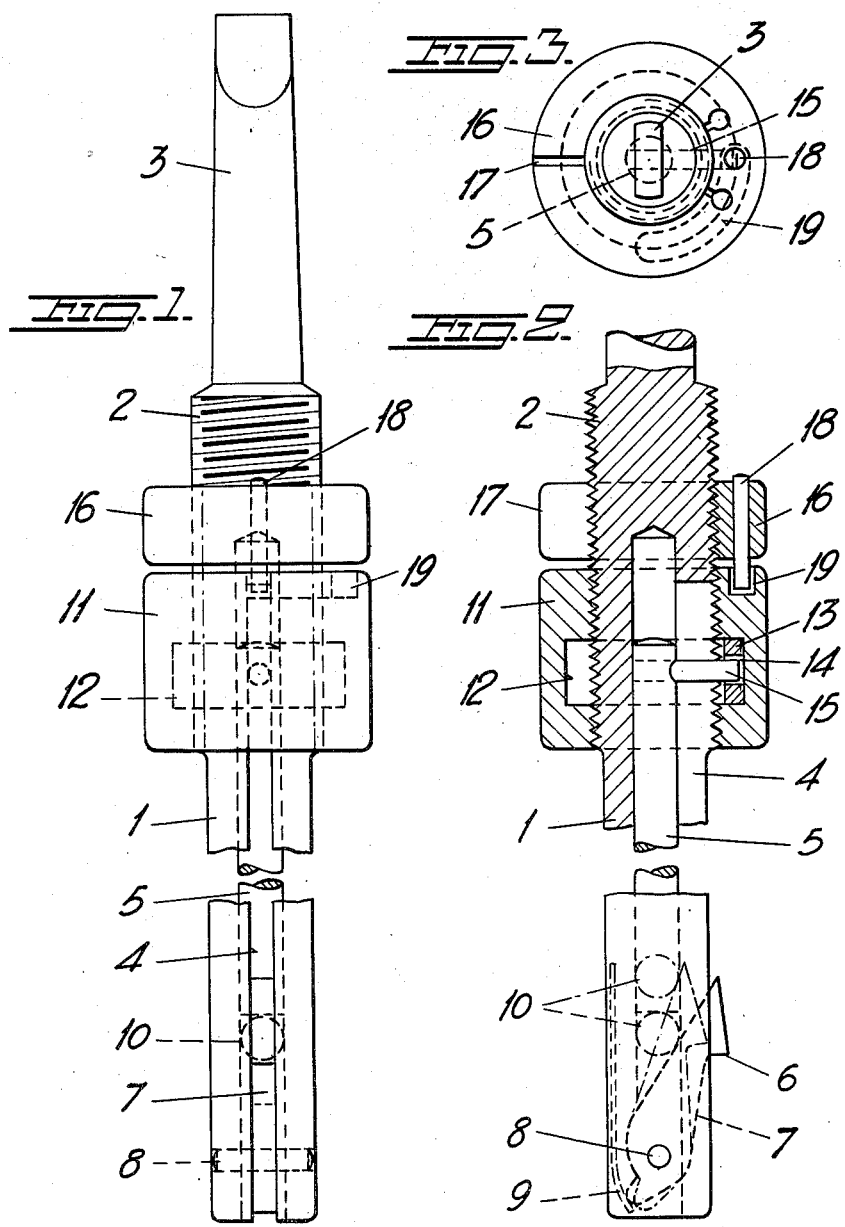

2,515,810

UNITED STATES PATENT OFFICE 2,515,810

GROOVE CUTTING TOOL

Algot Karl Gustaf Birger Törnborg, Nassjo, Sweden

Application February 27, 1948, Serial No. 11,447
In Sweden March 28, 1944

Section 1, Public Law 690, August 8, 1946
Patent expires March 28, 1964

2 Claims. (Cl. 29—96)

The present invention relates to a simple and practical tool for cutting grooves, which is substantially adapted for use in connection with boring machines, especially boring machines of the type having manual feed control. It is to be noted, however, that the tool according to the invention may also be used in combination with planing machines, shearing machines, slotting machines and, generally, in combination with all such machine tools, the tool support or holder of which is adapted or may be caused to perform a reciprocating movement. The groove cutting operation to which reference is made in this connection is the cutting of key-ways in hubs or similar machine elements.

More particularly, the invention relates to a groove cutting tool of the kind which comprises an arbor adapted to be clamped to the reciprocating tool support or holder of the machine tool in question and to be introduced into the opening of the hub or other machine element which is to be provided with an internal key-way, said key-way being cut by means of a cutting element adjustably mounted in the arbor, the setting of which is effected by means of an adjusting element rotatably mounted on the arbor which may comprise a nut or a similar element screwed onto the arbor which acts on a rod slidably mounted in the arbor for cooperating with the cutting element for controlling the setting thereof to working position by turning the adjusting element in one direction.

The characteristic feature of the invention involves, essentially, that the nut or similar element is formed with an internal annular groove engaged by a projection, as a pin, carried by the sliding rod which is in a slidable engagement with an axial slot formed in the arbor. In addition to said nut the arbor carries another nut which is more difficult to turn than said firstmentioned nut because of a more close fitting on the arbor and a resulting greater friction therewith, said other nut acting as a sort of feeler, the arrangement of said nut with relation to each other being such that a rotation of the firstmentioned nut in either direction will encounter a resistance afforded by the other nut after a certain angle of rotation, whereupon the other nut will be caused to partake in the rotation of the firstmentioned nut.

An embodiment of the invention is illustrated in the accompanying drawing, in which:

Fig. 1 is a side elevation, Fig. 2 is a part sectional side elevation, and Fig. 3 is an end view of the groove cutting tool forming the subject matter of the invention.

As already stated the groove cutting tool or implement comprises an arbor 1 the diameter of which corresponds substantially to the diameter of the boring (as for a shaft) of a hub or other machine element to be formed with an internal key-way. The arbor 1 is formed with a screwthreaded middle portion 2 and a conical end portion 3, the latter being adapted to be introduced and rigidly held in the tool holder of a machine tool and to this end it may comprise a standard or Morse's cone. Formed in the arbor is an axial slot 4 which extends to such a depth so as to reach an axial boring formed centrally in the arbor in which is slidably mounted a rod 5. Mounted in said slot 4 adjacent the end of the arbor is a cutting element in the shape of a pawl 7 or the like having a cutting edge 6 which is mounted to turn on a pivot 8. Said pawl is acted on by a plate spring 9 tending to set the pawl to a normal position in which the pawl is situated entirely or partly inside the slot 4. The above said rod 5 controls pawl 7 either directly or by means of a ball 10 inserted between the end of the rod and the back of the pawl. Screwed on the threaded portion 2 of the arbor 1 is a nut 11 having an annular groove 12 formed in its internal surface. Engaging said annular groove is a ring segment 13 which may slide in the circumferential direction in said groove. Formed in said ring segment 13 is an opening 14 engaged by a pin 15 carried by the rod 5 which is also guided by the slot 4 in the arbor 1.

The threaded portion 2 of arbor 1 carries above the nut 11, another nut 16 which is slit, as shown at 17, and so dimensioned as to embrace the said threaded portion by a certain initial pressure, so that it will be more difficult to turn the nut 16 than to turn the unslit nut 11. Instead in nut 16 is an axial pin 18, the lower end of which projects beyond the lower surface of nut 16 and engages an arc-shaped groove 19 formed in the upper end surface of nut 11, as clearly shown in Fig. 2.

To mount the groove cutting tool or implement above described it is only required to insert the cone 3 thereof in the tool holder of the machine in question, as for instance, in the tool holder of a boring machine, and clamp the working piece, which may be a belt pulley or a toothed wheel, etc. in the hub of which an internal key-way is to be cut while adjusting the position thereof on the table of the machine. Then the working operation may commence. By turning the nut 11 the cutting edge 6 of the pawl 7 may be removed from its position inside the slot 4, as shown by dotted lines in Fig. 2, to the position shown by full lines in which the cutting edge projects to some extent beyond the circumference of the arbor. Now, the cutting edge may be caused to cut into the material of the hub when the arbor is introduced into the boring of the hub upon the forward movement or working stroke of the tool support of the machine. Said movement may be controlled, for instance, by a hand lever. When in this way an initial groove is formed, the nut 11 should be turned back in a little degree so as to slightly retract the cutting edge before the return stroke of the arbor commences. Prior to the next working stroke the nut 11 is again turned forward in such a degree as to set the cutting edge 6 to a proper position for said next working stroke.

The second nut 16 above referred to has for its only object to act as a sort of feeler. As soon as the first cut is completed, the nut 11, as already stated, should be turned back a little. This turning back is continued, preferably, until the operator observes that the turning movement encounters a resistance afforded by an end wall of groove 19 engaging the end of pin 18, allowing the nut 16 to exert a certain resistance to the turning movement. Before the next cut is made in order to increase the depth of the groove under forming, the nut 11 should again be turned to a position for again setting the cutting edge for operation. To this end the nut 11 is first rotated until the other end wall of groove 19 engages pin 18 and then further rotated a certain angle while taking the nut 16 with it. In this way the operator may readily ascertain how large angles the nut 11 ought to be rotated each time. The manner of operation above described is repeated until the groove is finished.

The shape of the cutting element may, of course, be varied. Likewise, I may use instead of the nut 11 a rotatable sleeve formed with an appropriate guide slot engaged by the free end of pin 15. The construction as a whole is remarkably simple and, consequently, cheap to manufacture. It is also to be noted that it is of great importance that the groove cutting tool or implement above described may be used in combination with machines already to be found in a work shop and that the mounting of the tool or implement on any of such machines requires but a simple manual operation.

What I claim is:

1. A tool comprising in combination, an arbor adapted for mounting in a reciprocating tool holder of a machine tool and further adapted to be clamped in a machine head and adapted to be provided with a groove for receiving a key, a cutting element adjustably mounted in said arbor for cutting the groove under the action of a reciprocating movement of the arbor as caused by the reciprocation of the tool holder, means to effect the adjustment of said cutting element, said means comprising a nut screwed on the arbor and a rod slidably mounted in an axial boring of the arbor, said rod being arranged for controlling the position of the cutting element by setting it to working position upon turning of said nut in one direction the nut being formed with an integral annular groove and the rod being provided with laterally projecting element for engaging said groove through a longitudinal slot formed in the arbor, another nut screwed on the arbor which is more difficult to turn thereon than said firstmentioned nut, said nuts being provided with coengaging means for allowing a certain rotation of the nuts with relation to each other while causing the second nut to partake in the rotation of the firstmentioned nut after the elapse of said relative rotation in either direction, thereby allowing the second nut to act as a feeler to indicate the end of said relative rotation by introducing a resistance to the continued rotation of the first mentioned nut.

2. A tool as claimed in claim 1, characterized by the insertion of a ball between the slidable rod and the cutting element for transmitting a movement between the rod and the cutting element.

ALGOT KARL GUSTAF BIRGER
TÖRNBORG.

REFERENCES CITED

The following references are of record in the file of this patent:

UNITED STATES PATENTS

| Number | Name | Date |
| --- | --- | --- |
| 827,816 | Owen | Aug. 7, 1906 |
| 1,547,108 | Ellis | July 21, 1925 |